INVENTORS
William B. Thompson &
BY James P. Miller

Bryce Beecher
ATTORNEY

United States Patent Office 3,043,276
Patented July 10, 1962

3,043,276
AUXILIARY VALVE FOR USE IN A FLUID POWER STEERING GEAR
William B. Thompson, Newton Center, Mass., and James P. Miller, Bridgeport, Mich., assignors to General Motors Corporation, Detroit, Mich., a corporation of Delaware
Filed Sept. 24, 1959, Ser. No. 842,096
4 Claims. (Cl. 121—38)

This invention relates to an improvement in fluid-operated servo mechanisms wherein the control is provided by an open-center valve, and in its most specific aspect concerns servo mechanisms of this type which are applied in the power steering of automotive vehicles.

The conventional fluid power steering gear comprises a constant displacement pump belt-driven by the crankshaft of the vehicle engine, a fluid motor operably connected to a steering member and a control valve in the fluid circuit between the pump and motor, such valve having a normal or neutral position corresponding to the straight-ahead position of the dirigible wheels whereat fluid from the discharge side of the pump is permitted to flow through the valve against the static pressure of the fluid in the motor back to the suction side of the pump or to the reservoir from which the pump draws. In operation of such a gear, because of the narrowness of the spaces or gaps between the valving edges within the valve, a hissing noise is produced when the valve is on center or nearly so. This noise is of no consequence at high engine speeds when it is masked by engine noise, but at low engine speeds and under conditions of high pressure demand obtaining as during parking it is most annoying and has led to many complaints by vehicle operators who find it difficult to accept the explanation that the noise is "normal."

Heretofore, it has been suggested that the problem might be solved by means creating a back pressure in the return conduit between the control valve and the pump or reservoir. This, however, would result in a substantial waste of power during high speed operation of the engine and, moreover, this wasted energy would be accompanied by heating of the circulated fluid, which is manifestly undesirable.

In accordance with the present invention, auxiliary valve means are provided which operate to cause the development of a back pressure in the return conduit only when such a pressure is desirable, that is, under conditions of low engine speed and high pressure demand. Thus, the hissing sound is attenuated or prevented at the critical time, with no waste of power or heat build-up during high speed engine operation.

The invention will be described with the aid of the accompanying drawings illustrating a preferred embodiment and in which.

Figure 1:
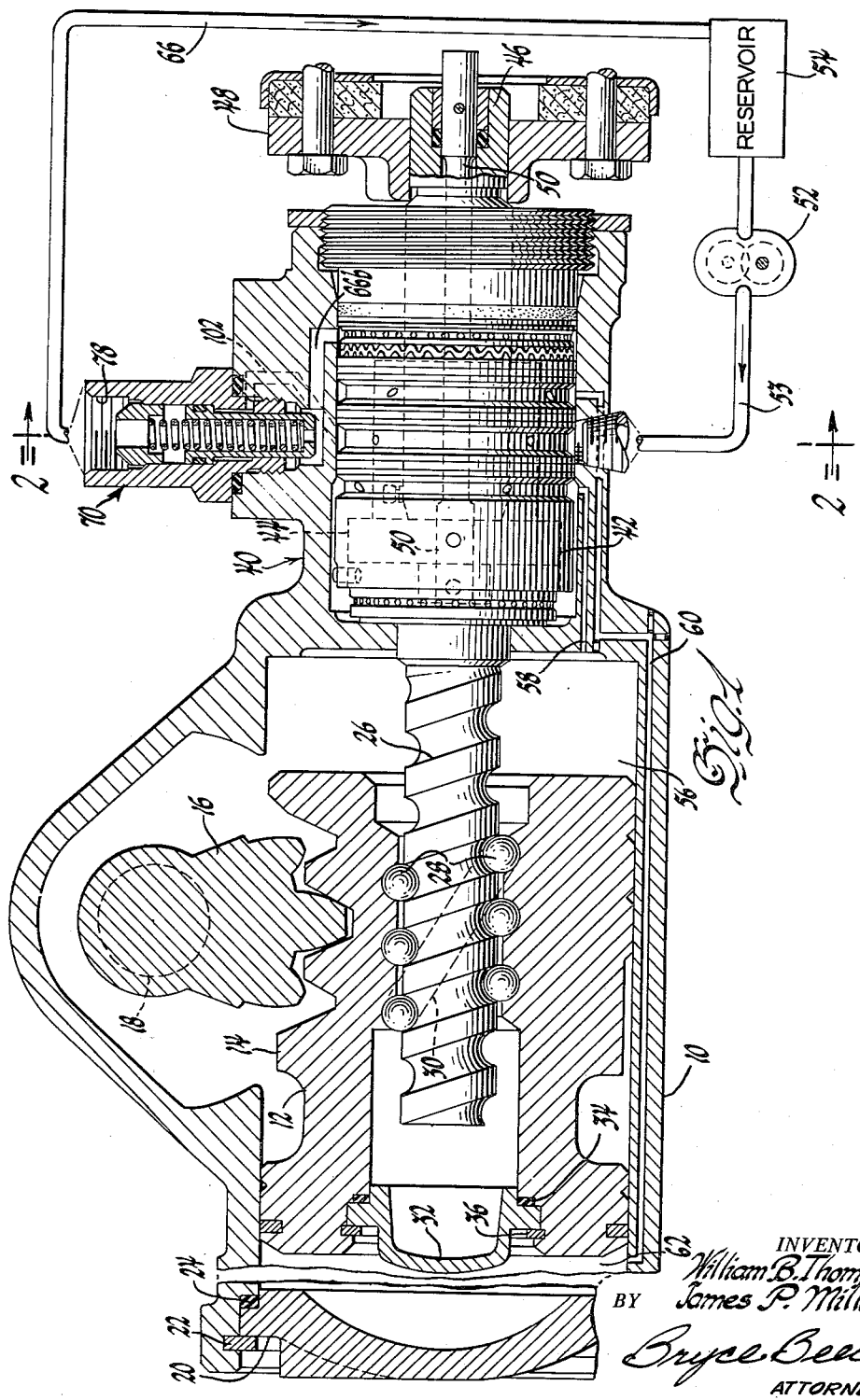
FIGURE 1 is a longitudinal view of a power steering gear incorporating the invention with parts shown in section, elevation, or in phantom lines, and with auxiliary parts being illustrated diagrammatically.

Referring first to FIGURE 1, the numeral 10 denotes a cylinder for a power piston 12. The latter has rack teeth 14 meshing with the teeth of a gear sector 16 integral with a shaft 18 which is journaled in the cylinder 10 and extends outwardly of the cylinder for connection to a pitman arm, not shown, whereby the steering linkage of the vehicle is actuated.

The end of the cylinder 10 beyond the piston 14 will be noted as closed by a cap piece 20 held in place by a snap ring 22 and annularly recessed for the accommodation of a seal 24.

Piston 12 is operably connected to a worm 26 through a train of balls 28 which, in operation of the gear, travel a course provided by the worm groove and a complementary helical groove formed internally of the piston. A transfer fixture for the balls 28 is indicated at 30. Such fixture interconnects the ends of the helical groove in the piston and provides for recirculation of the balls in a manner well understood in the art.

A cap piece 32 similar to cap piece 20 closes the bore of the piston at the left end thereof, being secured in place against a seal 34 by a snap ring 36.

In the particular embodiment, the teeth 14 of the piston 12 are generated on a concave pitch line, while the teeth of the sector 16 are formed as lever arms of different effective lengths. The purpose of this, as brought out in co-pending application Serial No. 684,929, filed September 19, 1957, now Patent No. 2,953,932 issued on September 27, 1960, is to provide a varying gear ratio facilitating the steering operation by reducing the number of turns of the steering worm required during parking and maneuvering in close quarters.

Rightward of the piston 12 will be seen a control valve 40 which need not be here described in any detail since the same is the subject of co-pending application Serial No. 762,153, filed September 19, 1958, as a continuation-in-part of application Serial No. 687,728, now abandoned. Suffice it to say that the valve has an outer sleeve member 42 connected to the worm 26 to rotate therewith and an inner sleeve member 44 rotatable relative to the member 42 to create a pressure differential across the piston 14, giving the power assist. Member 44 is connected to a stub shaft 46 which in turn is adapted for connection to the steering shaft, not shown, through a flexible coupling 48. A torsion rod 50, connected to the stub shaft 46 and the worm 26, tends to maintain the member 44 in a centered or neutral position corresponding to the straight-ahead position on the dirigible wheels of the vehicle.

A pump 52 drawing from a reservoir 54 and discharging through a conduit 53 develops the fluid pressure necessary for the operation of the gear. With the sleeve member 44 in center position, fluid circulates through the valve and back to the reservoir, as previously described herein. A line 66 will be seen connecting the valve and reservoir. Drilled passages 58 and 60 in cylinder 10 provide the necessary communication between the valve and the chambers 56 and 62 delineated by the piston 12.

No novelty is asserted in any of the parts or arrangements which have so far been described, these being merely environmental to the invention.

Figure 2:
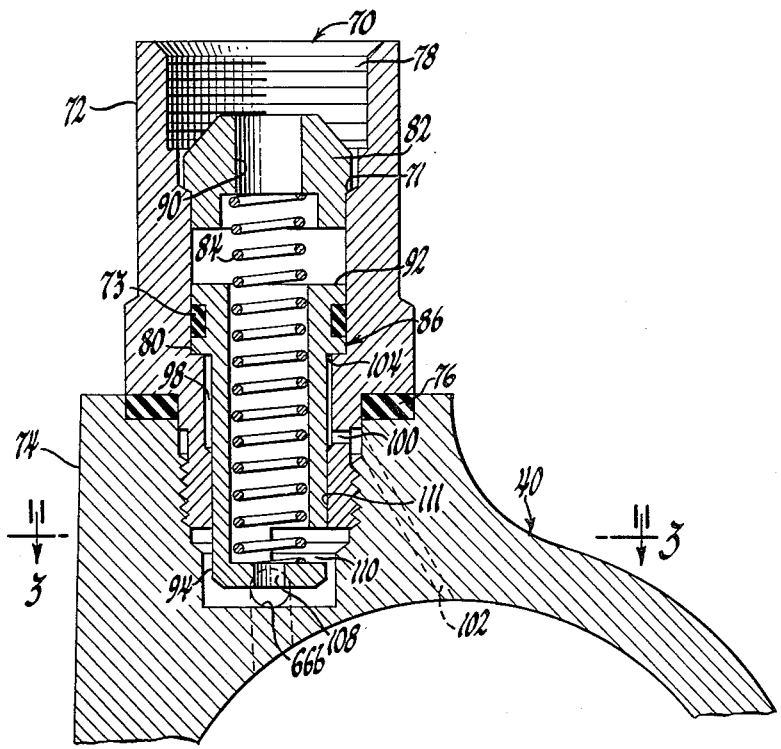
FIGURE 2 is an enlarged fragmentary section on the line 2—2 in FIGURE 1, certain parts appearing in FIGURE 1 being omitted.
Figure 3:
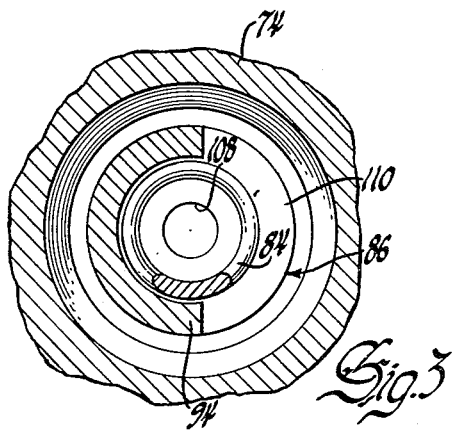
FIGURE 3 is a section on the line 3—3 in FIGURE 2.
Figure 4:
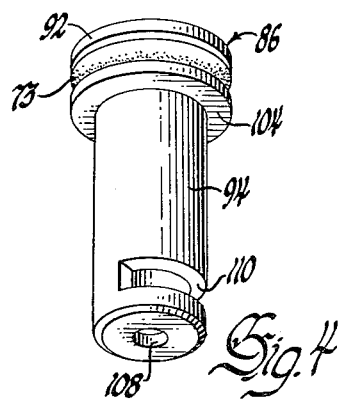
FIGURE 4 is a detail of one of the parts.

For the purpose of the invention, there is provided an auxiliary valve 70 fitted into the control valve housing 74 (actually a part of the cylinder 10) to govern the flow of fluid from and consequently the pressure in a passage 66b which represents a portion of the return conduit to the reservoir 54. As best shown by FIGURE 2, auxiliary valve 70 includes a housing portion 72 carrying a flange abutting a seal 76 disposed in an annular recess formed in housing 74. At its free end, housing 72 is threaded (78) to receive the end fixture of the hose corresponding to conduit 66 (FIGURE 1).

The bore of the housing 72 will be noted as stepped to provide shoulders 71 and 80. A plug 82 pressed into the housing 72 and having engagement with the shoulder 71 takes the reaction of a spring 84 biasing a hollow plunger 86 to its shown position. Plug 82 has a central bore 90 representing a continuance of the passage through the plunger 86. The latter will be seen as having an enlarged head portion 92 which in the normal position of the plunger abuts the shoulder 80 and a body portion 94 extending from the head portion toward the control valve 40. That part of the body portion 94 adjacent the head portion 92, which carries a seal 73, is spaced from the encircling wall of the bore of the housing 72 to provide an annular chamber 98 which is at all times connected to the discharge or pressure side of the pump 52 through the valve 40, passages 100 and 102 being provided for this purpose. Thus, the annular area 104 of the head portion 92 of the plunger is at all times subject to the influence of the pressure of the fluid in conduit 53.

The body portion 94 of plunger 86 terminates in an orifice 108, while just inward of such orifice is a slot 110. This slot 110 in the normal position of the plunger 86 is open to the passage 66b. Thus, with the plunger in such position, there is relatively little restriction to the flow of fluid therethrough and, consequently, any back pressure existing at 66b is negligible.

The position of the plunger 86 as shown in the drawing (FIGURE 2) corresponds to the vehicle condition where the engine is being operated at relatively high speed, as during cruising down a highway. In this situation, any turning of the dirigible wheels required is accomplished with relatively little pressure build-up in the fluid motor, since at the higher vehicle speeds there is little resistance to turning of the wheels. Accordingly, the pressure developing in the chamber 98 is insufficient to cause upward displacement of the plunger 86 and closing of the slot 110 by the valving surface 111. During parking or maneuvering in close quarters, however, due to the increased resistance to turning of the dirigible wheels, high pressures are required to displace the piston 12 and these pressures are, of course, reflected in the chamber 98. Thus, plunger 86 is forced upwardly by reaction of the fluid in the chamber against the head 92 of the plunger and fluid flow from passage 66b through the slot 110 becomes blocked. Flow through orifice 108 continues, of course, but because of the relatively small size of such orifice it exerts a throttling effect, resulting in a pressure at 66b sufficient to reduce the turbulence of the return fluid flow through the gaps in the control valve to a point where the hissing noise mentioned in the forepart hereof is not heard. Once the high system pressure condition has ceased, the plunger 86 is, of course, restored to its shown position by force of the spring 84.

We claim:

1. In an hydraulic servo system including a source of fluid pressure, a double-acting fluid motor and an open-center control valve for said motor, said control valve being connected to said source via a pressure conduit and a return conduit, an auxiliary valve located in said return conduit comprising a housing portion having a passage therein open to said pressure conduit, an element in said housing portion having a first position whereat fluid flow through said return conduit is relatively unhindered and a second position whereat flow through said last conduit is relatively restricted, said element being resiliently biased toward its first said position and having a reaction surface open to said passage whereby on the development of a predetermined pressure in said passage it is displaced from its first said position to its second said position.

2. In an hydraulic servo system including a source of fluid pressure, a double-acting fluid motor and an open-center control valve for said motor, said control valve being connected to said source via a pressure conduit and a return conduit, an auxiliary valve located in said return conduit comprising a housing portion having a passage therein open to said pressure conduit, a plunger in said housing portion having resilient means associated therewith operating to bias the plunger toward a first position whereat fluid flow through said return conduit is relatively unhindered, said plunger having a reaction surface open to said passage whereby on the development of a predetermined pressure in said passage it is displaced from its first said position to a second position whereat flow through said return conduit is relatively restricted.

3. In an hydraulic servo system including a source of fluid pressure, a fluid motor and an open-center control valve for said motor, said control valve being connected to said source via a pressure conduit and a return conduit, an auxiliary valve located in said return conduit comprising a housing portion having a passage therein open to said pressure conduit, a hollow plunger in said housing portion having therein a relatively restricted opening and a relatively unrestricted opening through which fluid coursing said return conduit passes in the normal position of the plunger, said plunger further having a reaction surface open to said passage, and a spring tending to maintain said plunger in its said normal position, said auxiliary valve being characterized in operation in that upon development of a predetermined pressure in said passage said plunger is displaced with closing of the said relatively unrestricted opening to fluid flow, such displacement being induced by reaction of the fluid in said passage against said surface.

4. In an hydraulic servo system including a source of fluid pressure, a fluid motor and an open-center control valve for said motor, said control valve being connected to said source via a pressure conduit and a return conduit, an auxiliary valve located in said return conduit comprising a housing provided with a stepped bore and a passage open to said pressure conduit, a hollow plunger in said bore including a head portion having a sliding fit in an enlarged portion of the bore, the inner edge surface of said head portion in the normal position of the plunger abutting a shoulder formed incident to the stepping of the bore, said plunger further including a body portion having an orifice in the end thereof opposite said head portion and a slot just inward of such end, said slot being open to said return conduit in the normal position of the plunger, said body portion extending from said head portion in the direction opposite the direction of fluid flow in said return conduit and in its area adjacent said head portion being of a diameter less than that of the surrounding wall of the bore to provide a chamber to which said passage opens, and a spring associated with the plunger and tending to maintain the same in its said normal position, said spring being housed in part by the plunger, the latter becoming displaced with closing of said slot to fluid flow upon the development of a predetermined pressure in said chamber, such displacement being induced by reaction of the fluid in the chamber against said head portion.

References Cited in the file of this patent
UNITED STATES PATENTS

| | | |
|---|---|---|
| 2,037,492 | Arnold | Apr. 14, 1936 |
| 2,893,082 | Hodler | July 7, 1959 |